Figure 1:
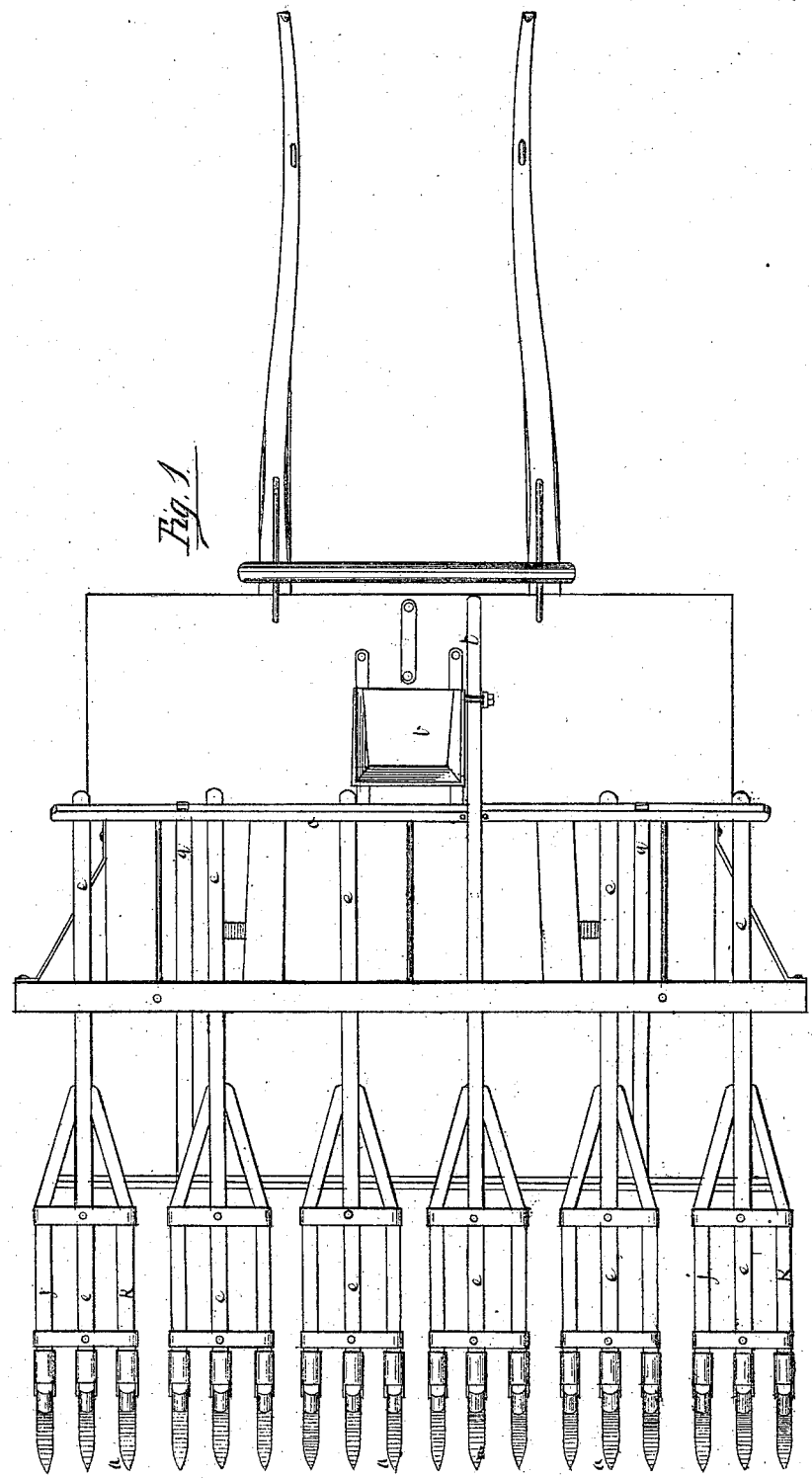

O. BONNEY, Jr.
Horse Rake.

No. 97,157.

2 Sheets—Sheet 1.

Patented Nov. 23, 1869.

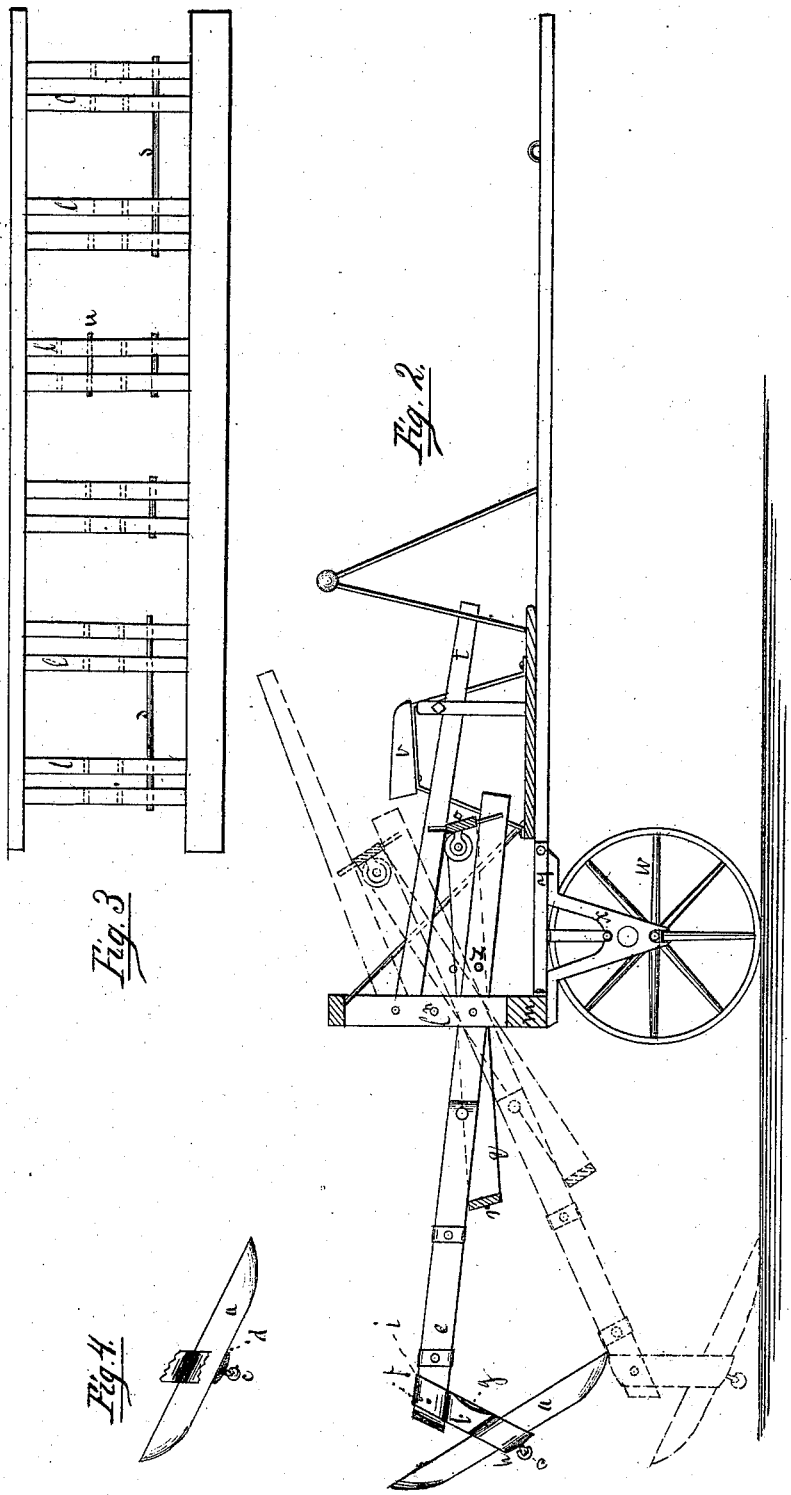

United States Patent Office.

OLPHA BONNEY, JR., OF SAN FRANCISCO, CALIFORNIA.

Letters Patent No. 97,157, dated November 23, 1869.

IMPROVED HORSE-RAKE.

The Schedule referred to in these Letters Patent and making part of the same.

*To all whom it may concern:*

Be it known that I, OLPHA BONNEY, Jr., of the city of San Francisco, in the State of California, have invented a certain new and useful Improvement on Horse-Rakes; and I do hereby declare that the following is a full, clear, and exact description of the construction and operation thereof, reference being had to the accompanying drawings, and to the letters and marks thereon, which said drawings form part of this specification, and represent a rake with my improvement as a part thereof, Figure 1 being a top view of said rake;

Figure 2, a side view;

Figure 3, a back view of the standards and their supporting-bars separate from the rake; and Figure 4, a view of one of the teeth, with its means for being held in the socket.

In all these figures, where like parts are shown, like marks and letters are used to indicate the parts.

The teeth $a$ of this rake are pointed or sloped at both ends, so that when the one end has become dull or too blunt, the tooth may be reversed, and the sharp end used.

The teeth are fitted into the shanks or knees $b$, and held therein by a thumb-screw, $c$, and plate $d$, the inner end of the thumb-screw pressing against the plate, which is interposed between the screw and the surface of the tooth.

The upper end of the shank or knee is held upon the bar $e$, which it surrounds, by a pin, $f$, or by a thumb-screw.

This manner of holding or socketing the teeth allows of the tooth being used longer or shorter, as may be desired; and the inclination at which the tooth is held in the shank enables this rake to hold, with the same length of tooth, twice as much hay as can be held when the teeth are arranged as usual in rakes of this character.

It is not necessary that the shank for holding the tooth should have its sides continuous and parallel, as is shown by fig. 2 of the drawings, for if that part of the shank marked $g$ be curved, then the holding-parts $h$ and $i$ of the shank may be with faces at right angles to the tooth and bar, and yet the tooth have the inclination shown.

When the shank is thus formed, a steadying-plate may be used between the end of the bar and the tooth.

The teeth are fitted to the central bar $e$, and to the side bars $j$ and $k$, so as to form a series of teeth and bars, having the central bar as the operating one, as is shown by fig. 1 of the drawings, and these series or gangs may be two or three in number, or of any number that may be required for a narrow or for a broad rake.

The central bar $e$ is pivoted in the standards $l$, which are supported by the cross-bar $m$ of the frame of the rake.

In these standards, at different points, are holes $n$, for the adjustment of the pivoted bar, to adapt the rake-teeth to any desired pitch.

The front end of the bar $e$ lies underneath the bar $o$, and between guiding pins $p$ therein.

From the bar $o$, other bars $q$ pass backward to the bar $r$, underneath the central bar $e$, and the other bars attached to them.

The bars $q$ are pivoted to the standards $l$ by pins $s$, so that the entire series or gangs of teeth and their bars may be raised by the one movement of the foot-bar $t$ above the bar $o$, this bar $t$ being pivoted at $u$ to the standards, and this elevating of the series or gangs may readily be done by the driver on the seat $v$ at any moment, to avoid stones or other obstructions in the track of the rake.

The driver can also readily elevate any one of the series or gangs he may wish to raise up, by acting with his foot upon the end of any one of the bars $e$.

This arrangement of the series or gangs allows of the use of the entire set, or only a part thereof, and of the elevating of any one or more of them, for avoiding stumps or roots, or for dumping.

The manner of attaching the gangs or series also allows of the detaching of any of the number, so as to have a broad or a narrow rake, and so as to have the narrow rake in the centre or at either side.

This rake is so constructed that it may be used with wheels $w$, attached, by braces or supports $x$, to the platform $y$, or it may be used without any wheels; and instead of wheels, affixed as here shown, any other wheels with suitable supports may be used, thus saving to the purchaser of the rake whatever expense would be incurred by the special wheels here shown.

This adaptability of the rake to different wheels and of different sizes, is formed by the construction and arrangement of the principal bars, as by moving them up or down, the pitch of the teeth may be regulated for large or small wheels.

Holes $z$ in the bars $e$ give further facilities for the adjustment of the teeth, by their movement further from or nearer to the standards $l$.

What I claim as my invention, and desire to secure by Letters Patent, is—

1. The combination of the thumb-screw and interposed plate with the knee or shank, for connecting the tooth of the rake to the bar, and for adjusting the tooth in the knee or shank, as herein recited.

2. The arrangement of the central bars $e$ in relation to the bars $o$, $q$, and $r$, and foot-bar $t$, whereby the entire series or gangs may be operated, as herein set forth.

3. The double adjustment of the bars $e$, upward and downward, and forward and backward, as and for the purposes herein recited.

OLPHA BONNEY, Jr. [L. S.]

Witnesses:
C. W. M. SMITH,
H. S. TIBBEY.